(12) United States Patent
Steiner

(10) Patent No.: US 7,850,751 B2
(45) Date of Patent: Dec. 14, 2010

(54) ACCESS COVER FOR PIPING OR VESSEL

(75) Inventor: Carl A. Steiner, Erie, PA (US)

(73) Assignee: TM Industrial Supply, Inc., Erie, PA (US)

( * ) Notice: Subject to any disclaimer, the term of this patent is extended or adjusted under 35 U.S.C. 154(b) by 342 days.

(21) Appl. No.: 11/959,689

(22) Filed: Dec. 19, 2007

(65) Prior Publication Data
US 2008/0092971 A1    Apr. 24, 2008

Related U.S. Application Data

(62) Division of application No. 10/414,056, filed on Apr. 15, 2003, now Pat. No. 7,332,010.

(60) Provisional application No. 60/373,016, filed on Apr. 16, 2002.

(51) Int. Cl.
*B65D 43/06* (2006.01)
*B65D 46/00* (2006.01)

(52) U.S. Cl. .......................... 55/385.1; 55/478; 55/480; 49/395; 49/394; 49/465; 292/48; 292/256.6; 292/256.65; 292/256.69; 220/263; 220/264; 220/265; 220/315; 220/316; 220/833; 220/835; 220/203.1; 220/203.22; 220/786; 220/787; 220/789; 220/234; 220/240; 220/320; 220/321; 220/322; 220/323

(58) Field of Classification Search ................ 55/385.1, 55/493, 478, 480; 95/268; 220/263–265, 220/315, 316, 833, 835, 203.1, 203.22, 786, 220/787, 789, 234, 240, 320–323; 49/395, 49/394, 465; 292/48, 256.6, 256.65, 256.69
See application file for complete search history.

(56) References Cited

U.S. PATENT DOCUMENTS

| | | | |
|---|---|---|---|
| 3,364,658 A | | 1/1968 | Walker |
| 3,667,649 A | * | 6/1972 | Thillet ........................ 220/323 |
| 3,748,785 A | * | 7/1973 | Craig ........................... 49/394 |
| 4,102,474 A | * | 7/1978 | Platts ......................... 220/323 |
| 4,156,601 A | | 5/1979 | Pieciak |
| 4,307,818 A | * | 12/1981 | Singh et al. .................. 220/316 |
| 4,433,987 A | | 2/1984 | Lenox |
| 4,444,575 A | | 4/1984 | Miller et al. |
| 4,692,175 A | | 9/1987 | Frantz |
| 4,767,427 A | | 8/1988 | Barabos et al. |
| 4,775,469 A | * | 10/1988 | Zimmerly .................... 210/237 |
| 4,818,398 A | * | 4/1989 | Lott et al. .................... 210/238 |
| 4,872,890 A | | 10/1989 | Lambrecht et al. |

(Continued)

*Primary Examiner*—Duane Smith
*Assistant Examiner*—Minh-Chau Pham
(74) *Attorney, Agent, or Firm*—The Webb Law Firm

(57) ABSTRACT

Disclosed is a two or three phase separator including a centrifugal separator, a demister (if a three phase separator), and a filter contained within a housing. The filter uses an outside-in flow principle. The filter includes an inner layer or a center core that defines a hollow interior. An outer layer is positioned adjacent and surrounding the inner layer. The outer layer includes a re-enforcement layer, a first particle filter layer, a coalescer layer, and a second particle filter layer. An access cover of the separator includes a cover plug, an actuator cam, a plurality of idler cam plates, and a plurality of mechanisms. The access cover cooperates with an opening and an annular groove in the housing to close off and seal the separator.

10 Claims, 9 Drawing Sheets

U.S. PATENT DOCUMENTS

| | | | |
|---|---|---|---|
| 5,549,723 A * | 8/1996 | Terry | 55/493 |
| 5,676,717 A | 10/1997 | Cope et al. | |
| 5,678,722 A * | 10/1997 | Reneau | 220/323 |
| 5,711,450 A * | 1/1998 | Reneau | 220/319 |
| 5,785,725 A | 7/1998 | Cusick et al. | |
| 5,827,430 A | 10/1998 | Perry et al. | |
| 5,846,271 A | 12/1998 | Flynn et al. | |
| 5,908,481 A | 6/1999 | Siddiqui | |
| 5,919,284 A | 7/1999 | Perry et al. | |
| 5,972,063 A | 10/1999 | Dudrey et al. | |
| 6,007,608 A | 12/1999 | Johnson | |
| 6,019,809 A | 2/2000 | Kahlbaugh et al. | |
| 6,095,365 A * | 8/2000 | Yielding | 220/264 |
| 6,109,823 A * | 8/2000 | Halferty et al. | 404/25 |
| 6,168,647 B1 * | 1/2001 | Perry et al. | 95/19 |
| 6,196,590 B1 * | 3/2001 | Kim | 280/830 |
| 6,214,077 B1 * | 4/2001 | Bitner et al. | 55/490 |
| 6,439,415 B1 | 8/2002 | Salim et al. | |
| 6,547,845 B2 * | 4/2003 | Grant, Sr. | 55/385.1 |
| 6,752,856 B1 | 6/2004 | Graze, Jr. | |
| 6,793,084 B1 * | 9/2004 | Wunsch | 220/1.5 |
| 7,036,674 B2 * | 5/2006 | McGuire | 220/263 |
| 7,051,897 B2 * | 5/2006 | McGuire | 220/321 |
| 7,341,161 B2 * | 3/2008 | McGuire | 220/321 |
| 7,410,530 B2 * | 8/2008 | Wagner et al. | 95/280 |
| 2002/0073667 A1 | 6/2002 | Barris et al. | |

* cited by examiner

ACCESS COVER FOR PIPING OR VESSEL

CROSS-REFERENCE TO RELATED APPLICATION

This application is a divisional of U.S. patent application Ser. No. 10/414,056, filed Apr. 15, 2003, now U.S. Pat. No. 7,332,010, which claimed priority to U.S. Provisional Patent Application Ser. No. 60/373,016, filed Apr. 16, 2002.

BACKGROUND OF THE INVENTION

1. Field of the Invention

The present invention is directed to a separator for gas under pressure, and, more particularly, to a separator that filters the gas in a second or third phase.

2. Description of Related Art

A separator is used to remove water and particulate materials from a pressurized gas, for example, a gas at approximately 280-1500 psig at 100° F. The gas may be natural gas, air, or any other gas. A three phase separator allows the gas to pass through three phases. Initially, in a first phase, the gas passes a centrifugal separator that removes large particles of liquid and debris and slows the velocity of the passing gas. Initial velocity of the gas may be less than 3 ft/sec. Next, in a second phase, the gas passes through a demister (or vane) to collect moisture in micron size and create droplets that fall to the bottom of the separator. Lastly, in a third phase, the gas passes through a filter to remove particulate materials and any remaining water. A radial velocity of the gas impacting on a surface area of the filter may be $\leq 0.3$ ft/sec. A two phase separator does not include the demister.

Current three phase (or two phase) separators utilize a filter that follows an inside-out flow principle. Gas flows from a hollow interior of the filter, through a filtering medium, and to the exterior of the filter. When using these types of filters, a high number of filters used in tandem are required in order to filter out all of the particulate materials and water. Typically, multiple sumps must be positioned to capture the water removed from the gas passing through the filter.

Since the gas is entering the separator at a high pressure, an access cover (that provides access to the interior of the separator) must be securely held in place. The cover is typically secured to a housing of the separator using a series of nuts and bolts surrounding a perimeter of the cover. In order to access the filter, or the interior of the separator near the filter, all of the nuts and bolts must first be removed. Once the task is completed, the nuts and bolts are reinserted. This is a labor and time intensive procedure.

Thus, a need exists to provide a separator that uses fewer filters and sumps. A need also exists to provide a cover that can be used with high pressure gas, yet can be easily and quickly removed from the separator housing.

SUMMARY OF THE INVENTION

It is an object of this invention to provide a separator having a more efficient filter.

It is another object of this invention to provide an access door, or cover, for the separator which is easily and quickly removable.

A two or three phase separator according to the present invention includes a centrifugal separator, a demister (if a three phase separator), and a filter contained within a housing. The filter is a coalescing gas filter element using an outside-in flow principle. The filter includes an inner layer or a center core that defines a hollow interior. An outer layer is positioned adjacent and surrounding the inner layer. The outer layer includes a re-enforcement layer, a first particle filter layer, a coalescer layer, and a second particle filter layer.

An access cover of the separator includes a cover plug, an actuator cam, a plurality of idler cam plates, and a plurality of mechanisms. The housing of the separator includes an opening and an annular groove positioned adjacent the opening. The access cover cooperates with the opening and the annular groove to close off and seal the separator.

In use, when the access cover is in a closed and locked position, exterior edges of the idler cam plates engage the annular groove, thereby, securing the access cover when pressurized gas flows through the separator. When it is desired to open the access cover after the gas is vented from the separator, for example, to replace the filter, force is applied to the actuator cam, for example, through a handle, causing it to rotate. Rotation of the actuator cam causes a pulling and pivoting of the idler cam plates. By this action, the exterior edges of the idler cam plates disengage from the groove. Thus, the access cover is unlocked and can be removed from the separator. To lock the access cover back into position, the above is reversed to push the exterior edges of the idler cam plates into engagement with the annular groove.

The separator may be used in a vertical configuration (the preferred use) or in a horizontal configuration. In the vertical configuration, a davit and handle mechanism is used to move the access cover towards and away from the opening in the separator. In the horizontal configuration, a hinge assembly is used to move the access cover towards and away from the opening in the separator.

DETAILED DESCRIPTION OF THE PREFERRED EMBODIMENTS

Figure 1:
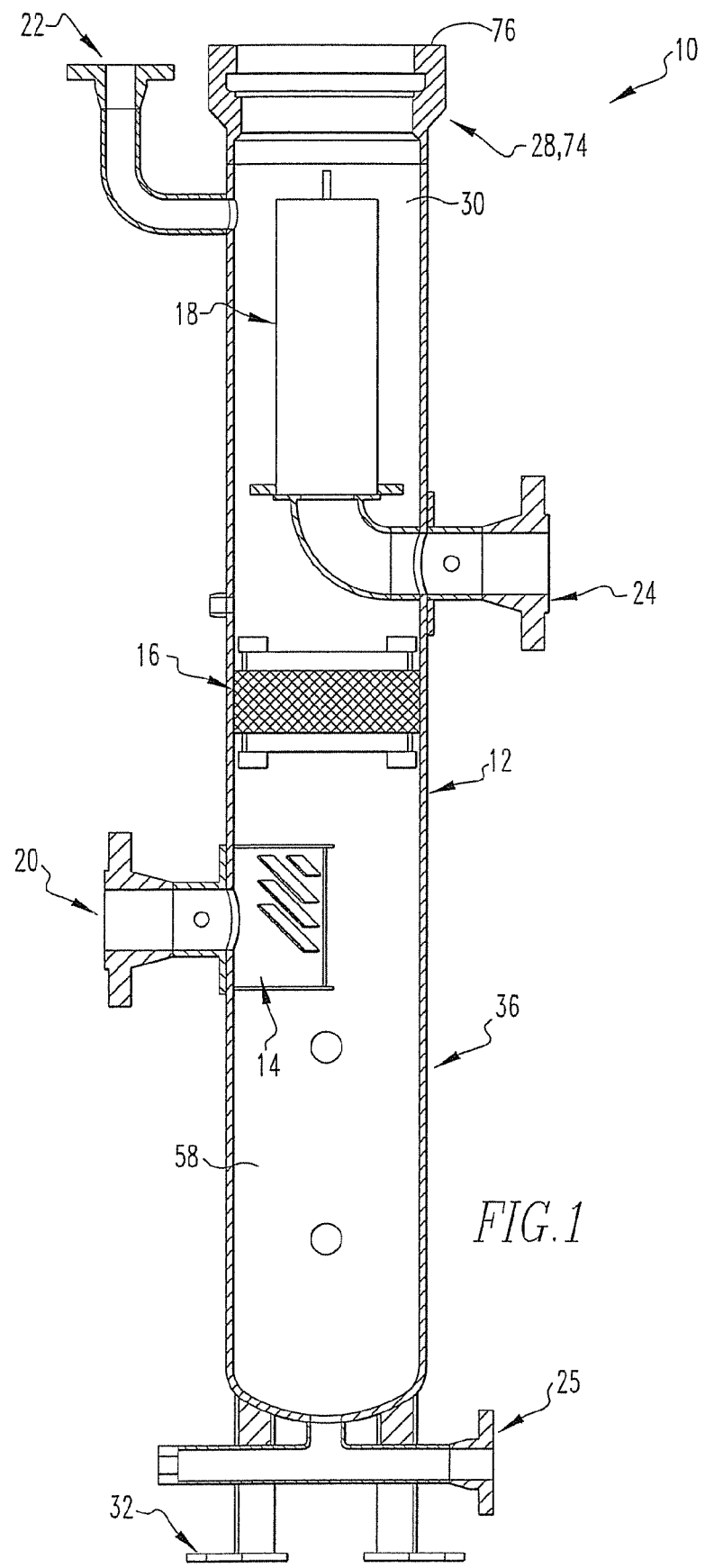
FIG. 1 is a side cross-sectional view of a separator according to the present invention.

A complete understanding of the invention will be obtained from the following description when taken in connection with the accompanying drawing figures wherein like reference characters identify like parts throughout.

For purposes of the description hereinafter, the terms "upper", "lower", "right", "left", "vertical", "horizontal", "top", "bottom", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 2:
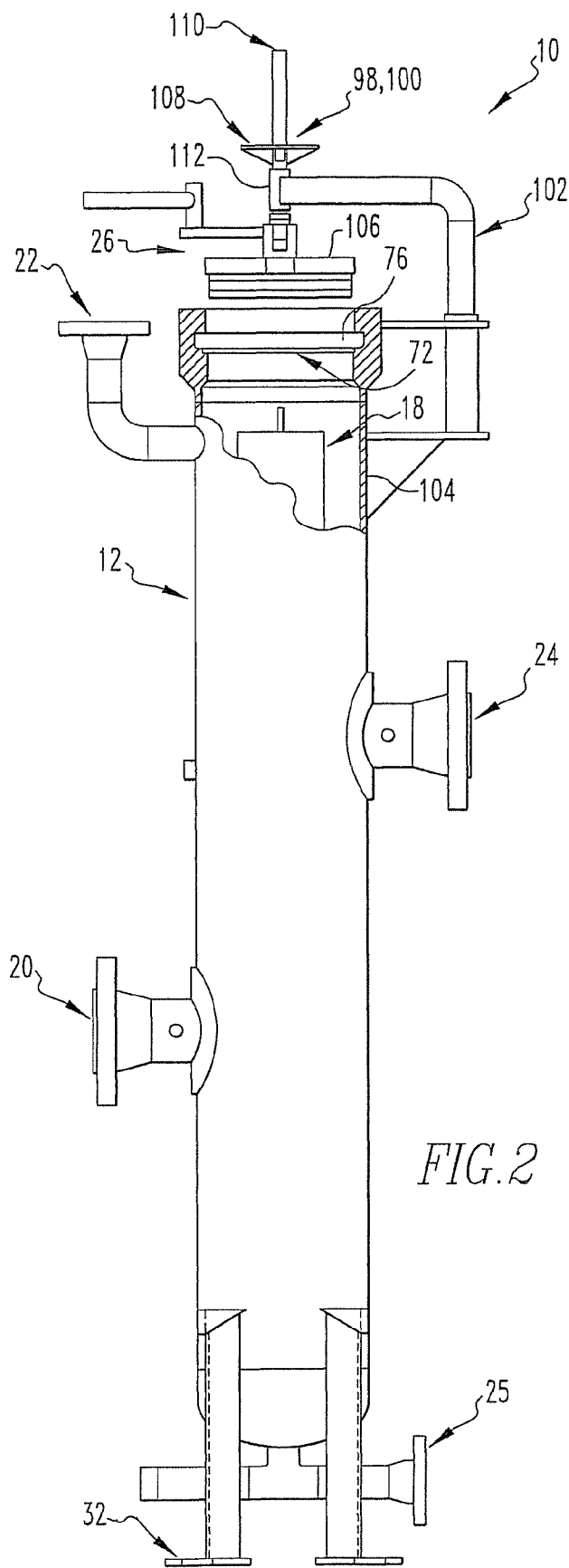
FIG. 2 is a side view with a partial cut-out of the separator shown in FIG. 1 having a second handle and davit.

Referring to FIGS. 1 and 2, a separator 10, for example, a three phase or two phase vertical separator, according to the present invention includes a housing 12. Within the housing 12 are a centrifugal separator 14, a demister 16 (if a three phase separator), and a filter 18. The separator 10 further includes a gas inlet 20, a gas vent 22, and a gas outlet 24. In use, the gas enters the separator 10 through the gas inlet 20, passes the first phase centrifugal separator 14, then the second phase demister 16, then the third phase filter 18, and exits the separator 10 through the gas outlet 24. Moisture removed from the gas exits the separator 10 through a drain 25.

The separator 10 also includes an access cover 26, preferably, located at a top 28 of the separator 10 to provide access to an interior 30 of the separator 10. The separator 10 may also include a foot ring or legs 32, preferably, located at a bottom 36 of the separator 10 to provide stability and support to the separator 10.

Figure 3:
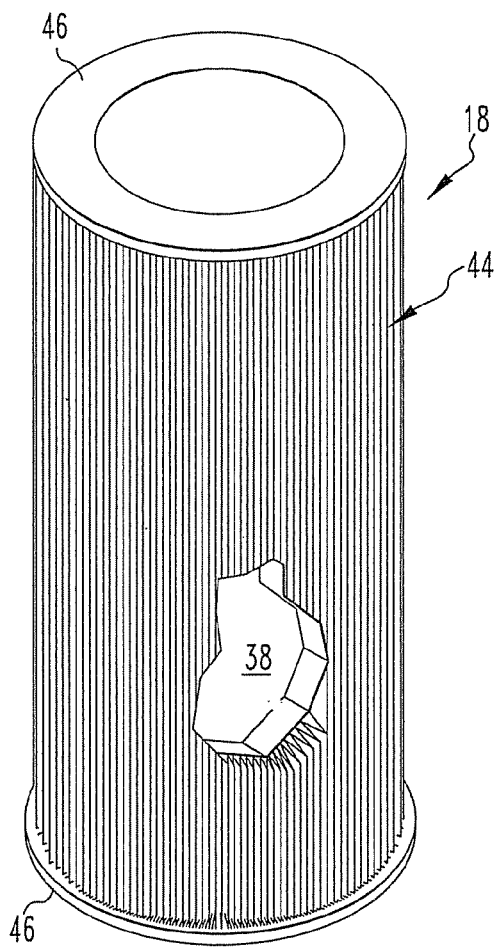
FIG. 3 is a perspective view with a partial cut-out of a filter according to the present invention.
Figure 4:
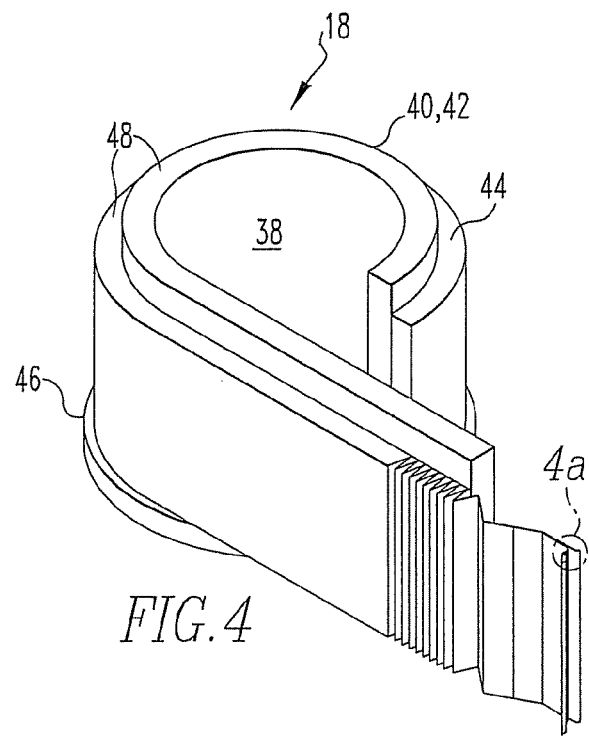
FIGS. 4 and 4a are schematic illustrations of an inner layer and an outer layer of the filter shown in FIG. 3.
Figure 4A:
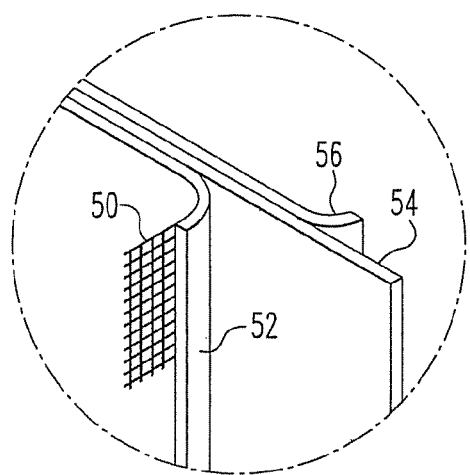

Referring to FIGS. 3, 4, and 4a, the filter 18 is a coalescing gas filter element using an outside-in flow principle. The filter 18 is preferably tube-like with a hollow interior 38. An inner layer 40 of the filter 18 is a center core 42, preferably, of sintered polyethylene, for example, 3 mm thick, which defines the hollow interior 38. An outer layer 44 of the filter 18 is positioned adjacent and surrounding the inner layer 40. The filter 18 may include end caps 46, for example, of polyurethane, to protect ends 48 of the inner layer 40 and the outer layer 44.

The outer layer 44 includes a re-enforcement layer 50, a first particle filter layer 52, a coalescer layer 54, and a second particle filter layer 56. In other words, the filter 18 is a series of layers starting from the hollow interior 38 with the center core 42. Adjacent the center core 42 is the second particle filter layer 56, preferably, of spun bonded polyester. The next layer is the coalescer layer 54, preferably, of micro-borosilicated glass. Adjacent the coalescer layer 54 is the first particle filter layer 52, preferably again, of spun bonded polyester. The outermost layer is the re-enforcement layer 50, preferably, of mesh screen. The outer layer 44, that is, the re-enforcement layer 50, the first particle filter layer 52, the coalescer layer 54, and the second particle filter layer 56, is vertically pleated to increase the available surface area for cleaning the gas that passes through the filter 18. For example, the filter 18 may provide approximately 20-80 ft$^2$ of surface area.

In use, when the gas enters the third phase, the gas is outside of the filter 18. The gas passes through the outer layer 44 and through the inner layer 40 to the interior 38 of the filter 18. The gas is then directed from the interior 38 of the filter 18 out through the gas outlet 24 of the separator 10. While passing through the outer layer 44, dust and particulate materials are first removed from the gas by the first particle filter layer 52. The coalescer layer 54 removes liquids in the gas. The second particle filter layer 56 "polishes" the gas with a final filtration by removing any remaining dust and particulate materials. The inner layer 40 (i.e., the center core 42) is a final polish filtration and safeguards any droplets of liquid passing through the interior 38 of the filter 18.

The coalescer layer 54 is preferably a matrix of microborosilicated glass fibers that remove the liquid in the compressed gas by diffusion, interception, and direct impact. As the gas passes through the coalescer layer 54, the liquid in the gas diffuses and collides to form small droplets. The droplets continuously enlarge as additional droplets collide. The droplets are drawn away from the filter 18 down a sump 58 (shown in FIG. 1) of the housing 12 by gravity to be removed from the separator 10 via the drain 25. The coalescer layer 54 is a non-wicking glass structure mat that allows the compressed gas to pass while providing an area for the gravitational accumulation of the droplets to flow to the sump 58 of the housing 12.

Referring to FIGS. 5-8, the access cover 26 of the separator 10 includes a cover plug 62, an actuator cam 64, a plurality of idler cam plates 66, and a plurality of mechanisms 68. The housing 12 of the separator 10 includes an opening 72, for example, in a region 74 near the top 28 of the separator 10. An annular groove 76 is positioned adjacent, for example, above, the opening 72. The access cover 26 cooperates with the opening 72 and the annular groove 76 to close off and seal the separator 10.

The cover plug 62 is configured to fit within and seal, for example, with the use of dual O-rings, the opening 72 of the housing 12 of the separator 10. Preferably, the opening 72 and the cover plug 62 are circular.

The actuator cam 64 is centrally positioned adjacent a top surface 78 of the cover plug 62. Preferably, the actuator cam 64 includes a plurality of protrusions 80 positioned around a perimeter 82 of the actuator cam 64.

The plurality of idler cam plates 66 surrounds the actuator cam 64. Interior edges 84 of the plurality of idler cam plates 66 are configured to cooperate with the actuator cam plate 64. Exterior edges 86 of the plurality of idler cam plates 66 are configured to cooperate with the annular groove 76 in the separator 10. Each of the plurality of idler cam plates 66 is connected to the actuator cam 64 by one of the plurality of mechanisms 68. Each of the plurality of mechanisms 68 may be, for example, a rod linkage. Each of the plurality of idler cam plates 66 is also pivotably connected to the cover plug 62, for example, by a shoulder screw 88. Preferably, each of the plurality of idler cam plates 66 includes a shoulder 90 and a valley 92 on the interior edge 84 which are configured to cooperate with a corresponding one of the plurality of protrusions 80 on the perimeter 82 of the actuator cam 64.

Preferably, a handle 96 extends from the actuator cam 64. Force applied to the handle 96 causes rotation of the actuator cam 64 in a first direction A or a second direction B.

In use, when the access cover 26 is in a closed and locked position (shown in FIG. 7), the exterior edges 86 of the plurality of idler cam plates 66 engage the annular groove 76 of the separator 10, thereby, securing the access cover 26 when pressurized gas flows through the separator 10. When it is desired to open the access cover 26 after the gas in the separator 10 has been vented, for example, to replace the filter 18, force is applied to the handle 96 of the access cover 26 to rotate the actuator cam 64 in the second direction B, for example, 30°. Rotation of the actuator cam 64 causes the plurality of mechanisms 68 attached to the actuator cam 64 to pull the respective plurality of idler cam plates 66. The plurality of idler cam plates 66 pivots on the shoulder screws 88 connecting the plurality of idler cam plates 66 to the cover plug 62. By this action, the exterior edges 86 of the idler cam plates 66 disengage from the annular groove 76. Thus, the access cover 26 is unlocked and can be removed from the separator 10.

Figure 7:
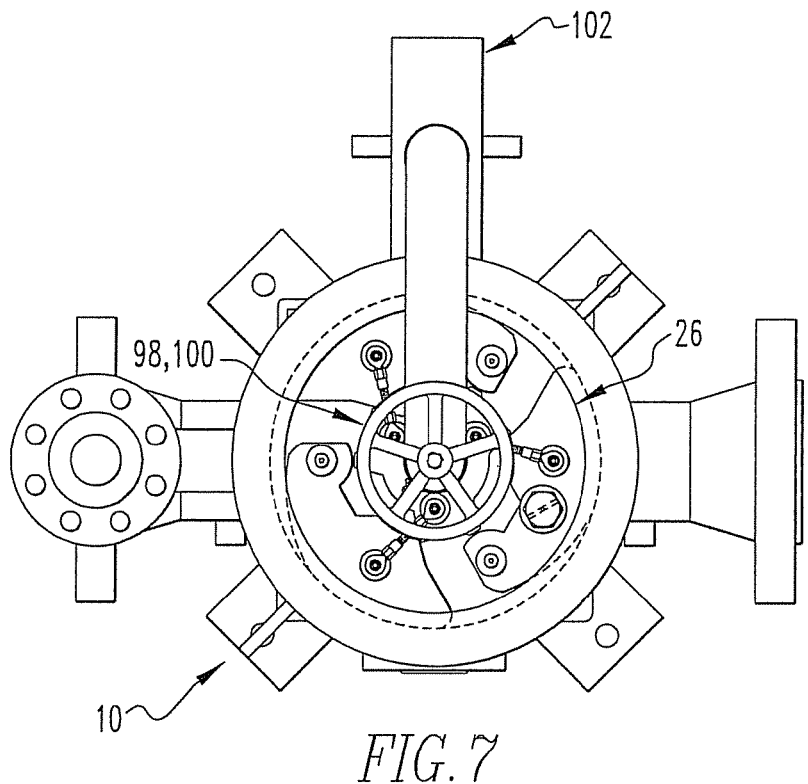
FIG. 7 is a top view of the separator shown in FIG. 2 with an access cover in a closed position.
Figure 8:
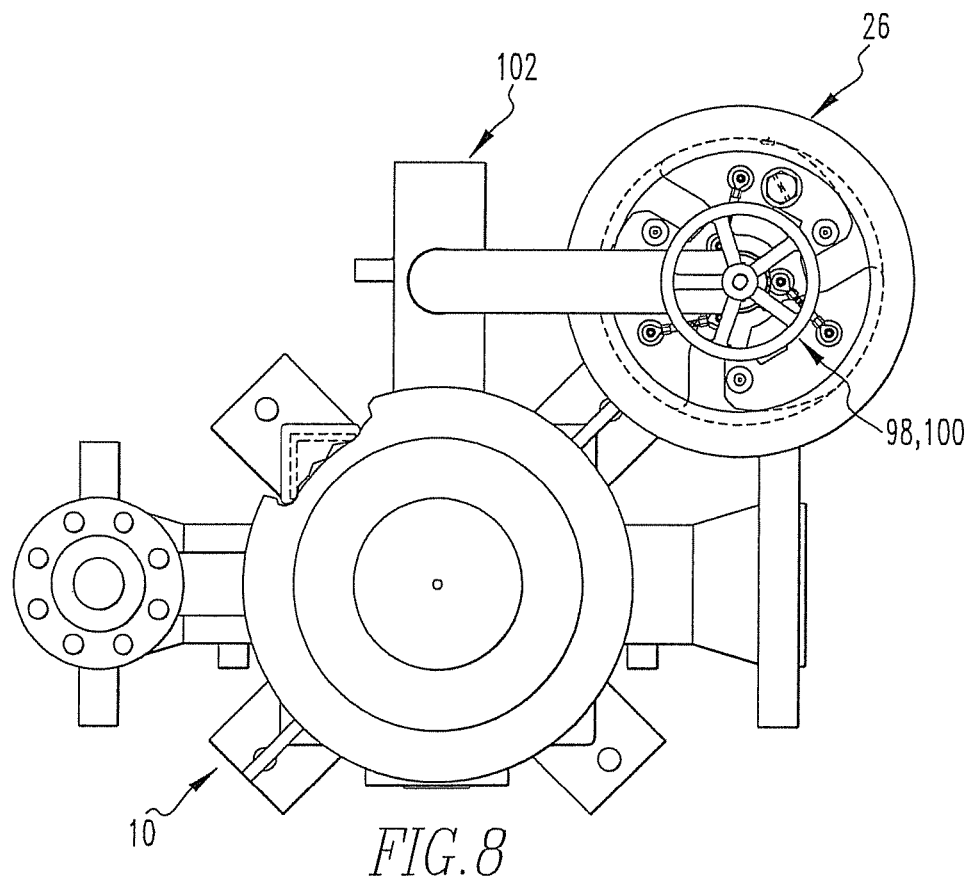
FIG. 8 is a top view of the separator shown in FIG. 2 with the access cover in an open position.

To facilitate removal of the access cover 26, a second handle 98, for example, a handwheel assembly 100, and a davit 102 may be attached to the separator 10, as shown in FIGS. 7 and 8. The davit 102 is pivotably attached to an exterior 104 of the housing 12, preferably, near the top 28 of the separator 10. The davit 102 may be an L-shaped tube that extends over a top 106 of the access cover 26. The handwheel assembly 100, for example, a handwheel 108 and threaded rod 110, is attached to the access cover 26, for example, to the actuator cam 64, and rotatably supported by an end 112 of the davit 102 not attached to the housing 12. Rotation of the handwheel 108 on the threaded rod 110 lifts the access cover 26 from the separator 10. Once the access cover 26 is lifted to a desired height, the davit 102 is pivoted to move the access cover 26 out of the way of access to the interior 30 of the separator 10 (shown in FIG. 8).

To place the access cover 26 back into a closed and locked position, the access cover 26 is pivoted back into alignment with the opening 72 of the separator 10. The handwheel assembly 100 is utilized to lower the access cover 26 back into position over the opening 72. Force is applied to the handle 96 in the first direction A to rotate the actuator cam 64. Rotation of the actuator cam 64 causes the plurality of mechanisms 68 attached to the actuator cam 64 to push the respective plurality of idler cam plates 66. The plurality of idler cam plates 66 pivots on the shoulder screws 88 connecting the plurality of idler cam plates 66 to the cover plug 62. By this action, the exterior edges 86 of the plurality of idler cam plates 66 engage the annular groove 76, thereby, closing and locking the access cover 26.

As a safety precaution, when the access cover 26 is in the closed and locked position, the plurality of protrusions 80 of the actuator cam 64 engages the shoulders 90 of the plurality of idler cam plates 66 and, thereby, holds the plurality of idler cam plates 66 in position. Thus, if one or more of the plurality of mechanisms 68 fails or the separator 10 suddenly shifts, the plurality of idler cam plates 66 will not disengage from the annular groove 76 and unlock the access cover 26. When the access cover 26 is unlocked, the plurality of protrusions 80 disengages from the shoulders 90 and engages the valleys 92 of the plurality of idler cam plates 66.

Figure 5:
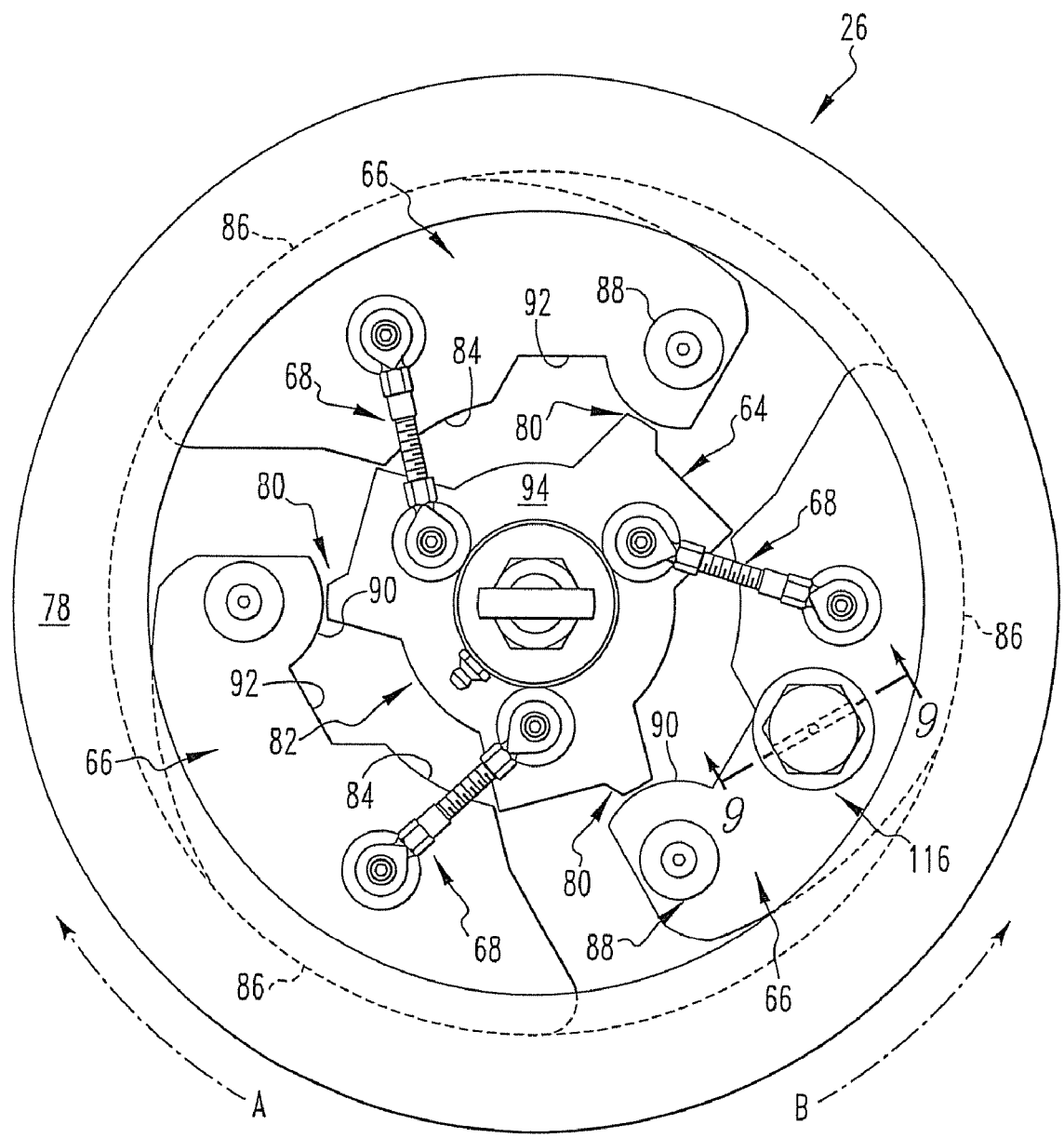
FIG. 5 is a top view of an access cover according to the present invention.
Figure 6:
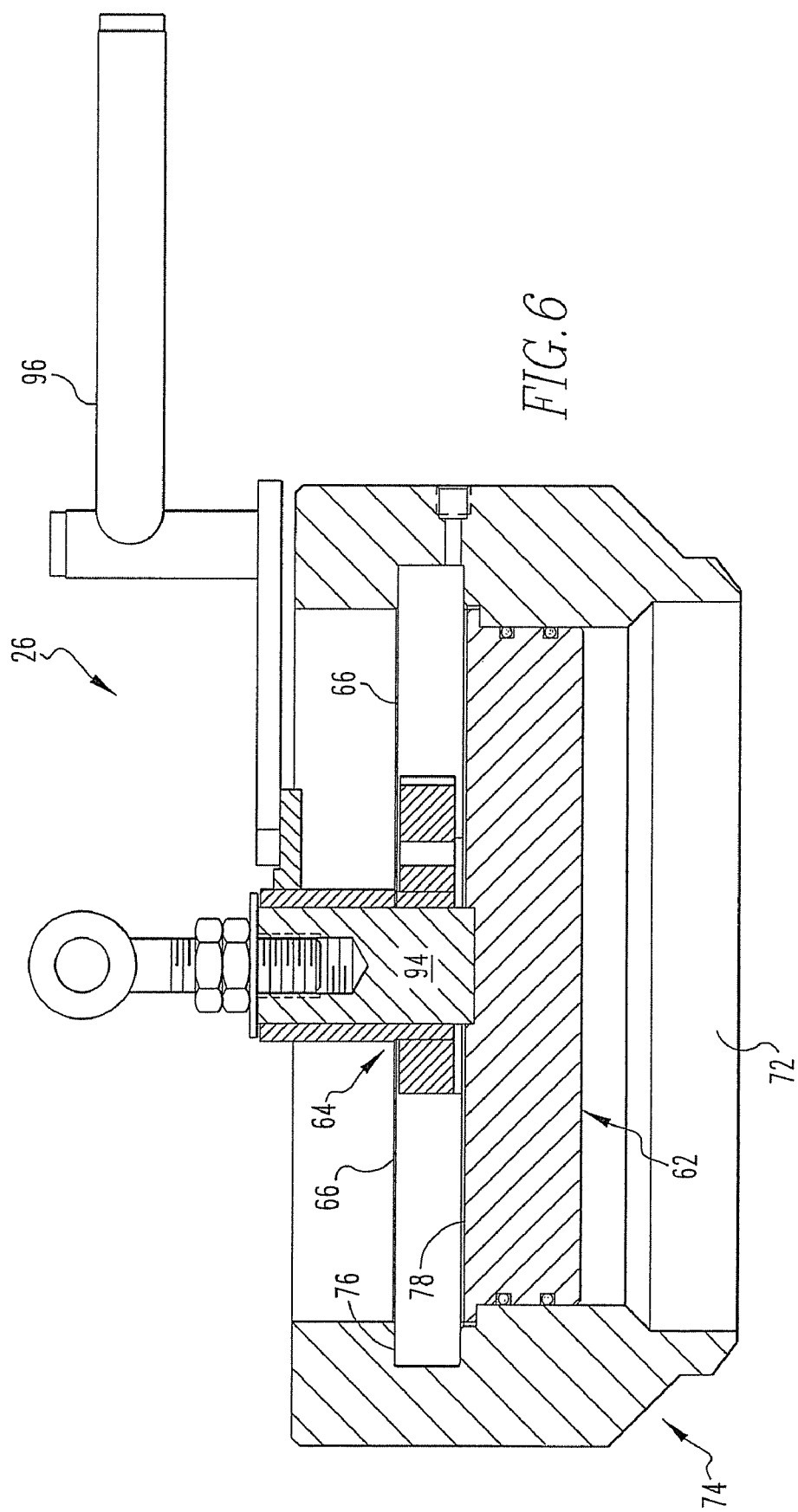
FIG. 6 is a side cross-sectional view of the access cover shown in FIG. 5 having a handle and positioned within a portion of a housing of a separator.
Figure 9:
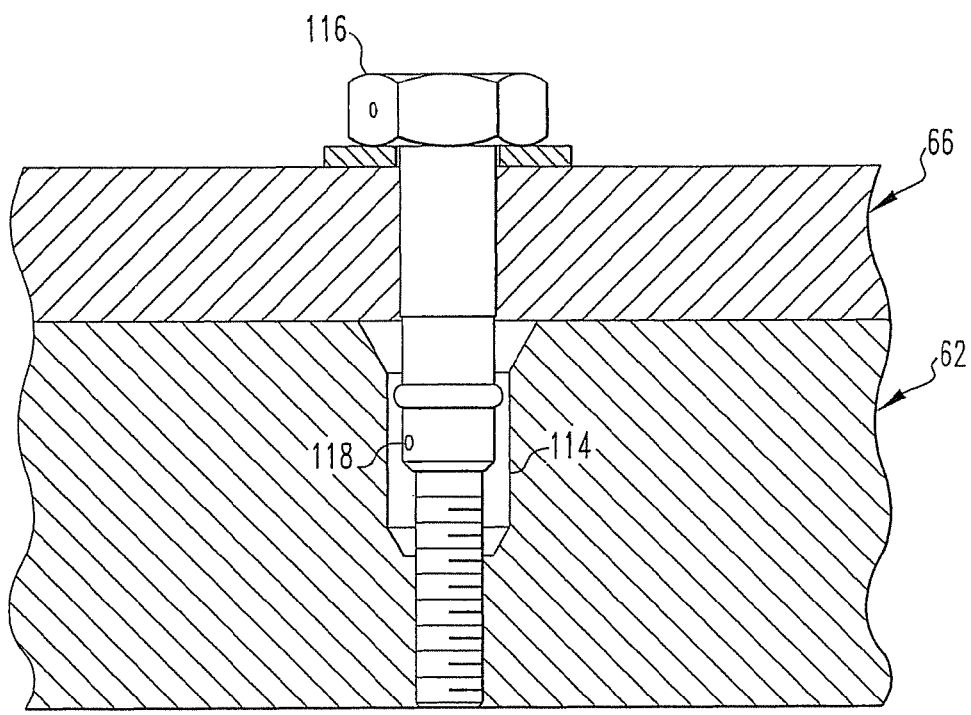
FIG. 9 is a side cross-sectional view taken along line 9-9 of FIG. 5.
Figure 10:
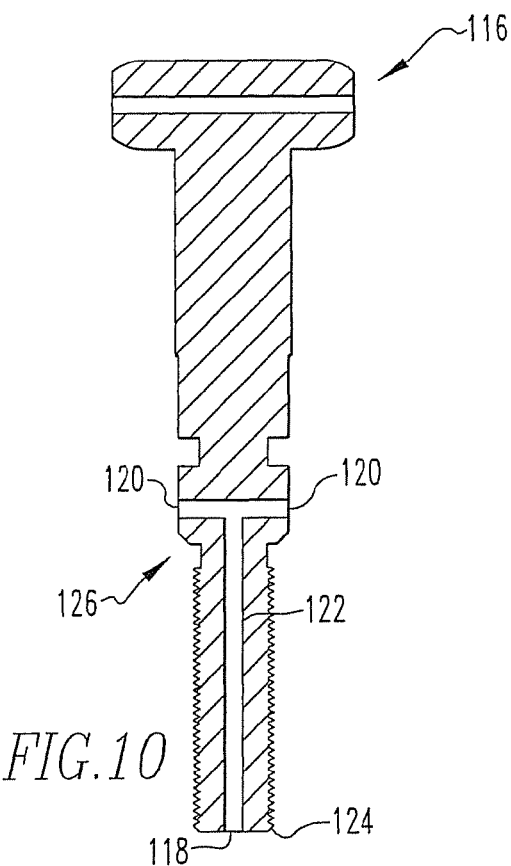
FIG. 10 is a side cross-sectional view of the safety bolt shown in FIG. 9.

Referring to FIGS. 5, 9, and 10, as another safety precaution, the access cover 26 further includes a bolt opening 114 in the access cover 26, for example, through one of the plurality of idler cam plates 66 and the cover plug 62. A safety bolt 116 is configured to mate with the bolt opening 114. The safety bolt 116 includes a first opening 118, at least one second opening 120, and a passageway 122. The passageway 122 extends between the first opening 118 and the at least one second opening 120. Preferably, the passageway 122 extends lengthwise from the first opening 118 at a bottom 124 of the safety bolt 116 to a mid-point 126 of the safety bolt 116, at which point the passageway 118 tees and continues transversely through the safety bolt 116.

When the safety bolt 116 is fully mated with the bolt opening 114, the first opening 118 is in fluid communication with the opening 72 of the separator 10 and the at least one second opening 120 is closed off by the access cover 26. When the safety bolt 116 is partially mated with the bolt opening 114, the first opening 118 is in fluid communication with the opening 72 and the at least one second opening 120 is open to atmosphere. Thus, in use, when the access cover 26 is in the closed and locked position, the safety bolt 116 is completely inserted into the bolt opening 114. Prior to opening the access cover 26, the safety bolt 116 is backed out of the bolt opening 114. If gas under pressure is present in the separator 10, the safety bolt 116 will emit a noise when the passageway 122 reaches the open atmosphere, due to the gas escaping through the passageway 122. If no gas is present, the safety bolt 116 will not produce the noise. The noise informs a user that pressurized gas is present and that it is not safe to remove the access cover 26.

Figure 11:
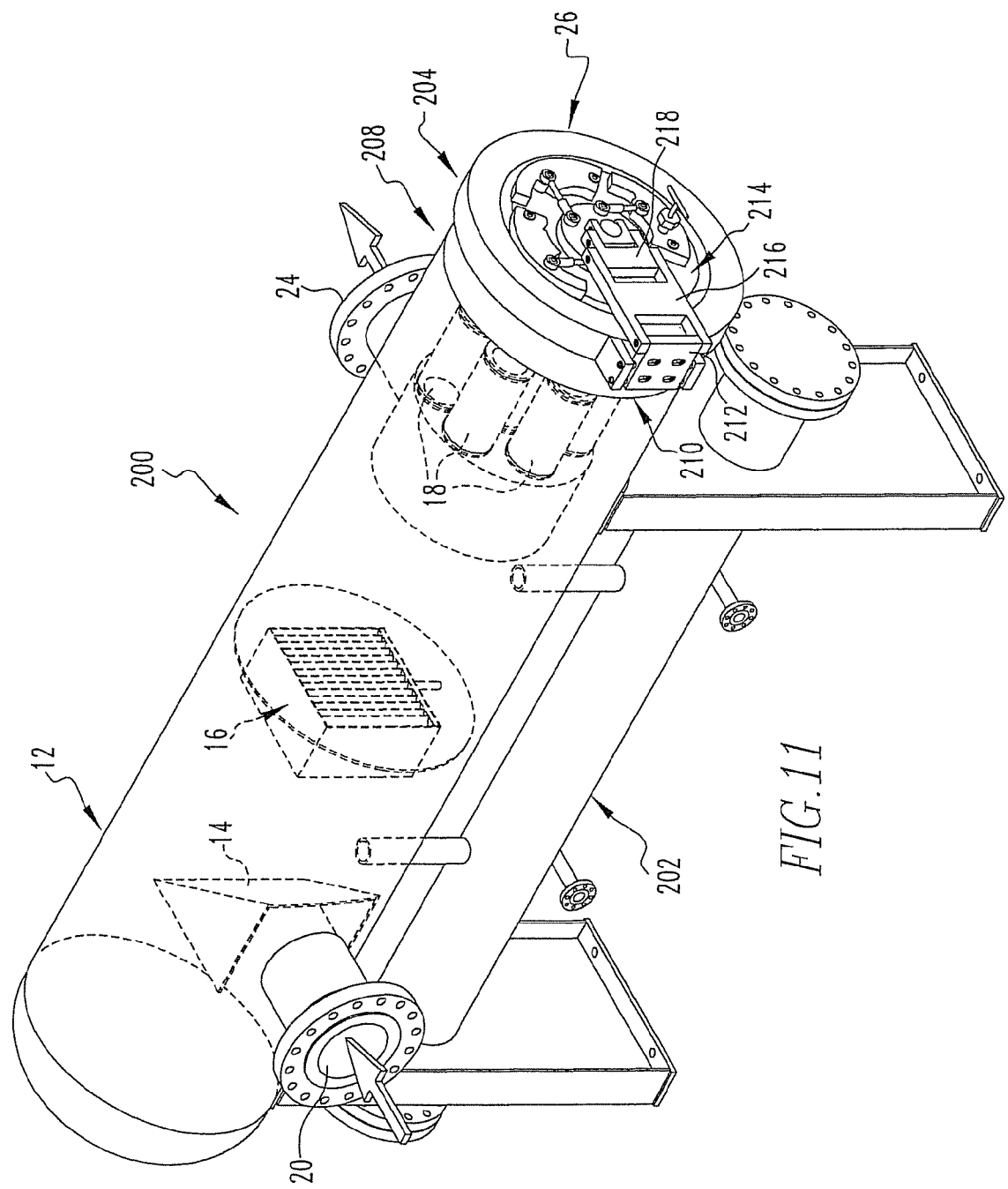
FIG. 11 is a perspective view of another separator according to the present invention.
Figure 12:
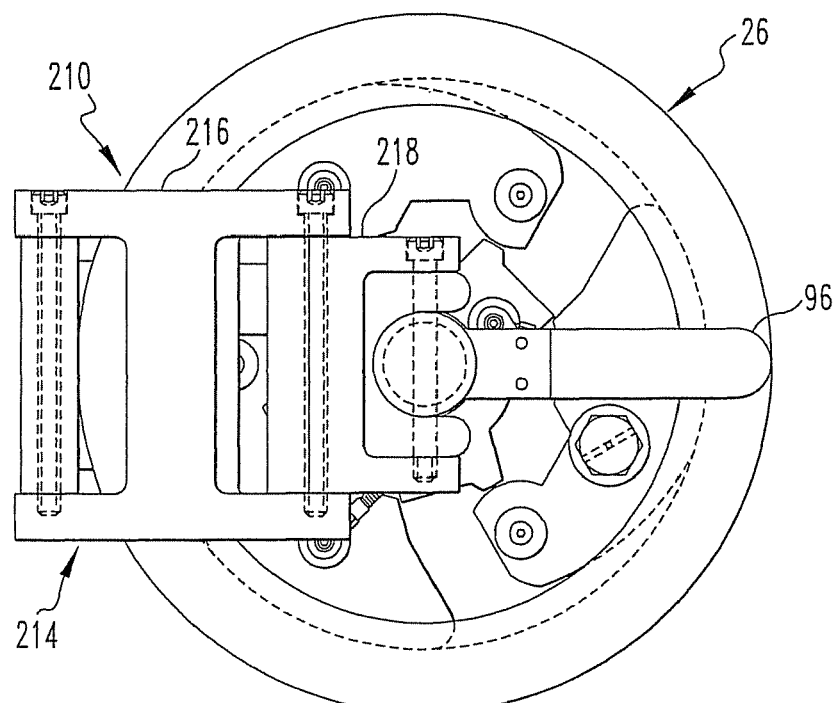
FIG. 12 is a top view of another access cover according to the present invention.
Figure 13:
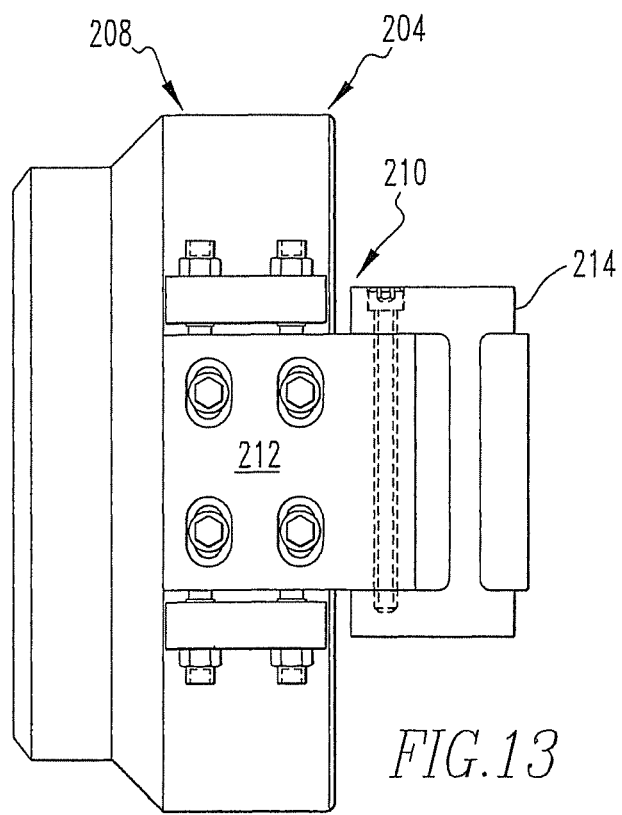
FIG. 13 is a side view of the access cover shown in FIG. 12.

FIGS. 11-13 depict another embodiment of the present invention and include many components that are substantially identical to the components of the above-described embodiment. Accordingly, similar components performing similar functions will be numbered identically to those components described above and will only be described as needed for understanding the below-described embodiment.

A separator 200 according to another embodiment of the present invention is a horizontal separator, as compared to the vertical separator 10. The separator 200, for example, a three phase or two phase separator, according to the present invention includes a housing 12. Within the housing 12 are a centrifugal separator 14, a demister 16 (if a three phase separator), and a filter 18. The separator 200 further includes a gas inlet 20 and a gas outlet 24. In use, the gas enters the separator 200 through the gas inlet 20, passes the first phase centrifugal separator 14, then the second phase demister 16, then the third phase filter 18, and exits the separator 200 through the gas outlet 24. Moisture removed from the gas accumulates in a bladder 202 and is later removed.

The separator 200 includes an access cover 26, preferably, located at an end 204 of the separator 200 to provide access to the interior 30 of the separator 200. The housing of the separator 200 includes an opening 206, for example, in a region 208 near the end 204 of the separator 200. The access cover 26 cooperates with the opening 206 and the annular groove 76 to close off and seal the separator 200.

To facilitate removal of the access cover 26, a hinge assembly 210 may be attached to the separator 200. The hinge assembly 210 includes a bracket 212 attached to the exterior 104 of the housing 12. An arm 214 is pivotally attached to the bracket 212. The arm 214 is also connected to the access cover 26, for example, through attachment to the handle 96 such that the handle 96 may still be rotated to rotate the actuator cam 64. To move the access cover 26 away from the opening 206, the arm 214 is pivoted with respect to the bracket 212, thereby removing the access cover 26 from within the opening 206 and pivoting the access cover 26 away from the opening 206. The process is reversed to place the access cover 26 back within the opening 206. The handle 96 may be used to facilitate pivoting the arm 214.

The arm 214 may include a first portion 216 and a second portion 218. The first portion 216 is pivotally attached to the bracket 212. The second portion 218 is pivotally attached to the first portion 216. The handle 96 is attached to the second portion 218. Alternatively or additionally, the second portion 218 may be attached to the access cover 26. To move the access cover 26 away from the opening 206, the second portion 218 is pivoted with respect to the first portion 216, and the first portion 216 is pivoted with respect to the bracket 212 (or vice versa). The process is reversed to place the access cover 26 back within the opening 206. The handle 96 may be used to facilitate pivoting the arm 206.

It will be understood by those skilled in the art that while the foregoing description sets forth in detail preferred embodiments of the present invention, modifications, additions, and changes might be made thereto without departing from the spirit and scope of the invention.

The invention claimed is:

1. An access cover for use on a piping or vessel, comprising:
   a cover plug configured to fit within an opening of the piping or vessel adjacent an annular groove in the piping or vessel;
   an actuator cam positioned adjacent the cover plug;
   a plurality of idler cam plates surrounding the actuator cam, each of the plurality of idler cam plates pivotably connected to the plug cover and including exterior edges configured to cooperate with the annular groove; and
   a plurality of mechanisms, each of the plurality of mechanisms attached to the actuator cam and one of the plurality of idler cam plates,
   wherein when the cover plug is fitted within the opening, rotation of the actuator cam in a first direction or a second direction causes each of the plurality of mechanisms to push or pull, respectively, each of the plurality of idler cam plates, thereby pivoting the plurality of idler cam plates such that the exterior edges engage or disengage with the annular groove, respectively.

2. The access cover according to claim 1, wherein the actuator cam is located at approximately a center of the cover plug.

3. The access cover according to claim 1, wherein:
   the actuator cam includes a plurality of protrusions positioned around a perimeter of the actuator cam,
   each of the plurality of idler cams includes a shoulder on an interior edge of each of the plurality of idler cams,
   each shoulder is configured to engage a corresponding one of the plurality of protrusions to lock the access cover.

4. The access cover according to claim 1, further including a handle extending from the actuator cam, wherein force applied to the handle causes rotation of the actuator cam.

5. The access cover according to claim 4, further including a hinge assembly including:
   a bracket adapted to attach to the housing; and
   an arm pivotally attached to the bracket and attached to the handle,
   wherein the hinge assembly removes the access cover from within the opening and pivots the access cover away from the opening.

6. The access cover according to claim 5, wherein the arm includes:
   a first portion pivotally attached to the bracket; and
   a second portion pivotally attached to the first portion and attached to the handle.

7. The access cover according to claim 1, further including a hinge assembly including:
   a bracket adapted to attach to the housing; and
   an arm pivotally attached to the bracket and attached to the access cover,
   wherein the hinge assembly removes the access cover from within the opening and pivots the access cover away from the opening.

8. The access cover according to claim 7, wherein the arm includes:
   a first portion pivotally attached to the bracket; and
   a second portion pivotally attached to the first portion and attached to the access cover.

9. The access cover according to claim 1, further including:
   a handwheel assembly attached to the access cover; and
   a davit supporting the handwheel and adapted to pivotally attach to the housing,
   wherein the handwheel assembly removes the access cover from within the Opening and the davit pivots the access cover away from the opening.

10. The access according to claim 1, further including:
    a bolt opening; and
    a safety bolt configured to mate with the bolt opening, the safety bolt including a First opening, a second opening, and a passage way extending between the first opening and the second opening,
    wherein when the safety bolt is fully mated with bolt opening, the first opening is in fluid communication with the opening of the piping or vessel and the second opening is closed off by the access cover, and when the safety bolt is partially mated with the bolt opening, the first opening is in fluid communication with the opening and the second opening is open to atmosphere.

* * * * *